(12) United States Patent
Malcarne

(10) Patent No.: US 12,070,024 B2
(45) Date of Patent: *Aug. 27, 2024

(54) ADJUSTABLE BUTT AND REEL SEAT FOR A FISHING ROD

(71) Applicant: WINTHROP TACKLE, Essex, CT (US)

(72) Inventor: Frederick J. Malcarne, Westbrook, CT (US)

(73) Assignee: WINTHROP TACKLE, Essex, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,854

(22) Filed: Jun. 1, 2021

(65) Prior Publication Data

US 2021/0282382 A1    Sep. 16, 2021

Related U.S. Application Data

(63) Continuation of application No. 17/172,933, filed on Feb. 10, 2021, now Pat. No. 11,051,500, which is a (Continued)

(51) Int. Cl.
*A01K 87/02*    (2006.01)
*A01K 87/06*    (2006.01)
(Continued)

(52) U.S. Cl.
CPC .............. *A01K 87/08* (2013.01); *A01K 87/02* (2013.01); *A01K 87/06* (2013.01); *F16C 11/10* (2013.01)

(58) Field of Classification Search
CPC ........ A01K 87/08; A01K 87/02; A01K 87/00; Y10T 403/32245; Y10T 403/32368;

(Continued)

(56) References Cited

U.S. PATENT DOCUMENTS

| 186,399 A | 1/1877 | Landis |
|---|---|---|
| 566,528 A | 8/1896 | Oliver |

(Continued)

FOREIGN PATENT DOCUMENTS

| DE | 10202773 A1 | 7/2003 |
|---|---|---|
| DE | 102007008812 A1 | 8/2008 |

(Continued)

OTHER PUBLICATIONS

*Winthrop Tackle, LLC*, Plaintiff, v. *Carbon Fishing, LLC*, Defendant; "Answer to Counterclaims"; filed in the United States District Court for the District of Connecticut on Oct. 14, 2021, Document ___; Case 3:21-cv-00947-VLB; 9 pages.

(Continued)

*Primary Examiner* — Darren W Ark
*Assistant Examiner* — Katelyn T Truong
(74) *Attorney, Agent, or Firm* — CANTOR COLBURN LLP

(57) ABSTRACT

An adjustable fishing rod butt includes a first elongate member hingeably attached to a second elongate member. The first elongate member includes an opening on a bottom surface thereof extending at least into an interior thereof, and an alignment locking member secured about the opening on the bottom surface thereof. The alignment locking member includes an opening coaxially aligned with the opening in the first elongate member. The second elongate member includes an adjustable reel seat portion on an upper surface, and an angle positioning arm extending from a bottom surface and oriented to be received by the openings in the first elongate member and the alignment locking member. A locking pin locks the angle positioning arm to provide the butt with a specific angular relationship.

11 Claims, 6 Drawing Sheets

Related U.S. Application Data continuation of application No. 16/402,748, filed on May 3, 2019, now abandoned.

(51) Int. Cl.
 *A01K 87/08* (2006.01)
 *F16C 11/10* (2006.01)

(58) Field of Classification Search
 CPC ..... G01B 3/56; A47F 13/06; B25J 1/04; B25J 1/02; B25J 1/00; E04D 13/0765; E01H 2001/1293; B25G 1/102; B62B 5/064; F16M 11/2014
 USPC ....... 43/23, 18.1 CT, 18.1 R, 25; 403/33, 83, 403/84, 85, 104; 15/143.1, 144.1; 294/209; 16/110.1, 429, 430
 See application file for complete search history.

(56) References Cited

U.S. PATENT DOCUMENTS

| | | | |
|---|---|---|---|
| 901,736 | A | 10/1908 | Pines |
| 1,009,883 | A | 11/1911 | Anderson |
| 1,031,839 | A | 7/1912 | Cochran |
| 1,943,479 | A | 1/1934 | Hesson |
| 1,962,232 | A | 6/1934 | Clairon |
| 2,000,263 | A | 5/1935 | Teetor |
| 2,037,435 | A | 4/1936 | Reichenbach |
| 2,158,104 | A | 5/1939 | Bowen |
| 2,642,609 | A | 6/1953 | Hruska |
| 2,840,332 | A | 6/1958 | Slutzky |
| 4,077,150 | A | 3/1978 | Barnes |
| 4,498,257 | A | 2/1985 | Jekel |
| 4,688,346 | A | 8/1987 | Collins |
| 4,796,373 | A | 1/1989 | Struntz |
| 4,845,882 | A | 1/1989 | Collins |
| 4,845,290 | A | 8/1989 | Wallace et al. |
| 4,858,365 | A | 8/1989 | Struntz |
| 5,142,809 | A | 9/1992 | O'Brien et al. |
| 5,470,037 | A | 11/1995 | Willis |
| 5,557,875 | A | 9/1996 | Testa |
| 5,697,184 | A | 12/1997 | Heller |
| 5,864,980 | A | 2/1999 | Lai |
| 6,067,741 | A | 5/2000 | Eaton |
| 6,089,652 | A | 7/2000 | Miller |
| 6,148,558 | A | 11/2000 | Ono et al. |
| 6,162,153 | A | 12/2000 | Perez, Jr. et al. |
| 6,176,034 | B1 | 1/2001 | Collins |
| 6,460,285 | B2 | 10/2002 | Collins |
| 6,974,113 | B1 | 1/2005 | Clark et al. |
| 7,454,862 | B2 | 11/2008 | Markley et al. |
| 7,533,484 | B2 | 5/2009 | Markley et al. |
| 7,717,375 | B2 | 5/2010 | Chen |
| 7,754,862 | B2 | 7/2010 | Mayo et al. |
| 7,761,951 | B1 | 7/2010 | O'Neal, Jr. |
| 7,941,964 | B2 | 5/2011 | Stanton |
| 8,087,629 | B2 | 1/2012 | Gotovac |
| 8,413,366 | B2 | 4/2013 | Malcarne |
| 8,919,031 | B2 | 12/2014 | Malcarne |
| 2002/0073601 | A1 | 6/2002 | DeSorcy |
| 2005/0072037 | A1 | 4/2005 | Markley et al. |
| 2005/0172534 | A1 | 8/2005 | Arcabascio |
| 2006/0107483 | A1 | 5/2006 | Karroll |
| 2006/0179705 | A1 | 8/2006 | Markley et al. |
| 2006/0230669 | A1 | 10/2006 | Markley |
| 2009/0084019 | A1 | 4/2009 | Carnevali |
| 2010/0194156 | A1 | 8/2010 | Kim |
| 2010/0251596 | A1 | 10/2010 | Malcarne |
| 2011/0308027 | A1 | 12/2011 | Major |
| 2012/0249527 | A1 | 12/2012 | Katayama |
| 2014/0068996 | A1 | 3/2014 | Steinhauser, Jr. |
| 2014/0182188 | A1 | 7/2014 | Brown |
| 2014/0259862 | A1 | 9/2014 | Malcarne |
| 2016/0198688 | A1 | 7/2016 | Duda |
| 2020/0344987 | A1 | 11/2020 | Malcarne |
| 2021/0161116 | A1 | 6/2021 | Malcarne |
| 2021/0321598 | A1 | 10/2021 | Boardman |

FOREIGN PATENT DOCUMENTS

| | | |
|---|---|---|
| GB | 1361570 A | 7/1974 |
| JP | 2012249527 A | 12/2012 |
| WO | 2020037426 A1 | 2/2020 |

OTHER PUBLICATIONS

*Winthrop Tackle. LLC*, Plaintiff, v. *Carbon Fishing, LLC*, Defendant; "Answer, Affirmative Defenses, and Counterclaims"; filed in the United States District Court for the District of Connecticut on Sep. 9, 2021, Document 20; Case 3:21-cv-00947-VLB; 16 pages.

*Winthrop Tackle. LLC*, Plaintiff, v. *Carbon Fishing, LLC*, Defendant; "Complaint"; filed in the United States District Court for the District of Connecticut on Jul. 9, 2021, Document 7-1; Case 3:21-cv-00947-VLB; 34 pages.

*Winthrop Tackle. LLC*, Plaintiff, v. *Carbon Fishing, LLC*, Defendant; "Defendant's Initial Invalidity Contentions"; filed in the United States District Court for the District of Connecticut on Mar. 16, 2022, Document ___; Case 3:21-cv-00947-VLB; 24 pages.

*Winthrop Tackle. LLC*, Plaintiff, v. *Carbon Fishing, LLC*, Defendant; "Defendant's Updated Invalidity Contentions"; filed in the United States District Court for the District of Connecticut on Aug. 16, 2022, Document ___; Case 3:21-cv-00947-VLB; 36 pages.

*Winthrop Tackle. LLC*, Plaintiff, v. *Carbon Fishing, LLC*, Defendant; "Joint Stipulation and Consent Motion for Dismissal of Count II or Carbon Fishing, LLC's Counterclaim"; filed in the United States District Court for the District of Connecticut on Oct. 18, 2021, Document 30; Case 3:21-cv-00947-VLB; 3 pages.

*Winthrop Tackle. LLC*, Plaintiff, v. *Carbon Fishing, LLC*, Defendant; "Claim Construction of Disputed Terms"; filed in the United States District Court for the District of Connecticut on Jan. 31, 2024, Document 63; Case 3:21-cv-00947-VLB; 20 pages.

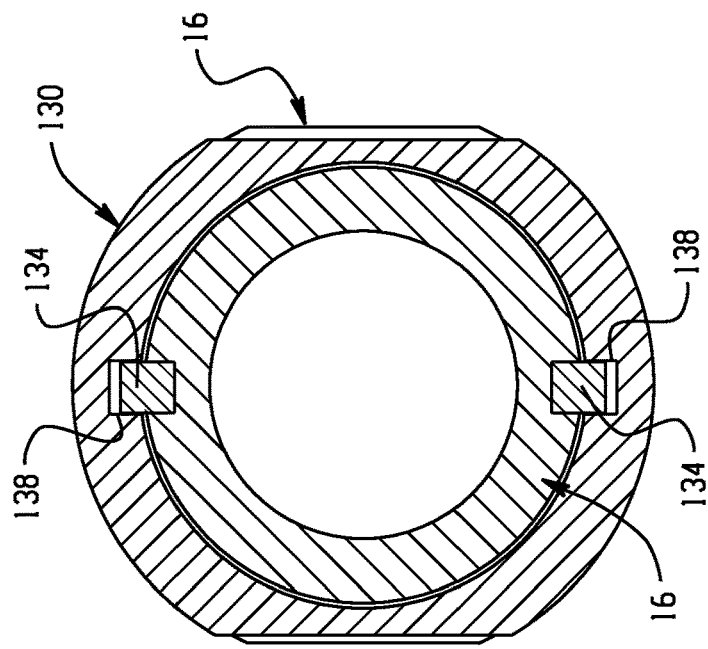
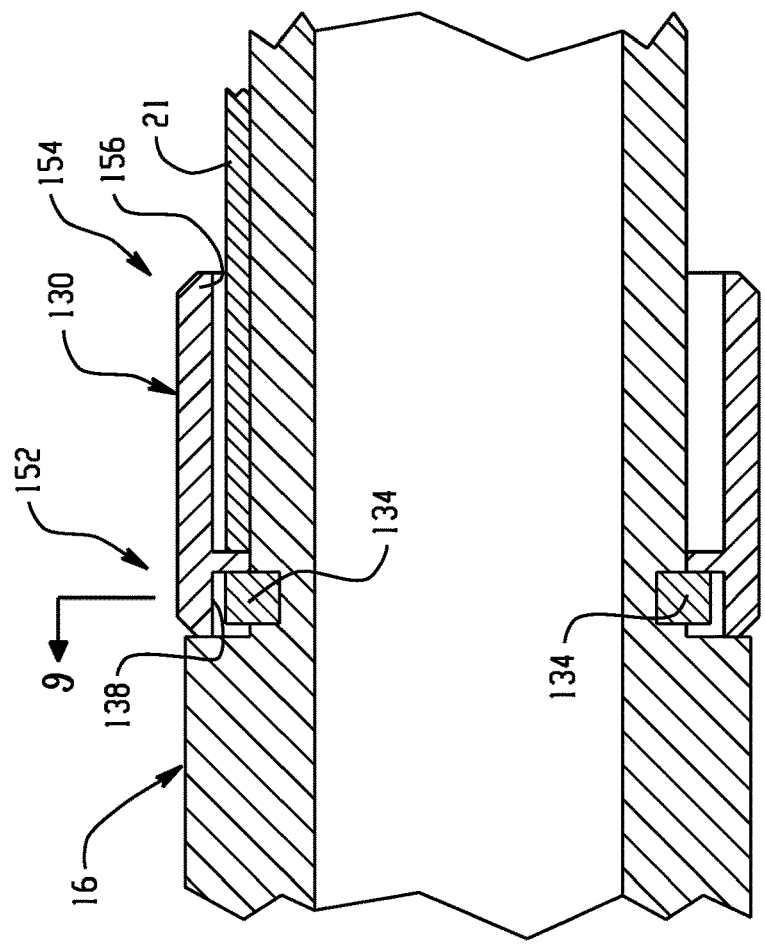

ADJUSTABLE BUTT AND REEL SEAT FOR A FISHING ROD

BACKGROUND

The present disclosure generally relates fishing rods and more particularly, to an adjustable butt end and reel seat for a fishing rod.

Most conventional fishing rods used for deep sea sport fishing are made of three primary sections, the rod blank, the handle or butt, and the reel seat. Typically, the rod blank is elongate and defines the distal end of the rod, which is intended to be fitted within the butt. The butt is of a static elongate design and generally includes the reel seat. The end of the butt is frequently in the form of a gimbal having intersecting notches, and therefore, the distal end of the butt is specifically configured to be received within a socket permanently but movably mounted on a "fighting chair" on a boat, a rod holder on a boat, or even on a "fighting belt" secured to a fisherman. In the sport of game fishing, strong forces are often encountered, which forces are transmitted through the rod to the butt assembly. The butt of the fishing rod typically is non-adjustable and has a curvilinear or linear shape for the particular fishing application. Straight rods are desirable when a fish are moving away from the rod. On the other hand, bent rods (i.e., curvilinear rods) are preferred when the fish are circling or moving transverse to the rod, which distributes the force exerted by the fish and thus enables the angler to apply increased force on the fish.

BRIEF SUMMARY

Disclosed herein is an adjustable butt for use with a fishing reel and a rod blank. A non-limiting example of the adjustable butt includes a first elongate member including an opening on a bottom surface thereof extending at least into an interior of the first elongate member. An alignment locking member is secured about the opening on the bottom surface thereof and includes an opening coaxially aligned with the opening in the first elongate member. A locking pin opening in sidewalls of the alignment locking member is configured to receive a locking pin. A second elongate member include an adjustable reel seat portion on an upper surface, and an angle positioning arm extending from a bottom surface and oriented to be received by the openings in the first elongate member and the alignment locking member. The angle positioning arm includes a plurality of alignment openings serially arranged along a length of the angle positioning arm, wherein each of the plurality of openings corresponds to a different angular relationship between the first and second elongate members. The locking pin locks the angle positioning arm and the first and second elongate members at a specific angular relationship defined by a selected one of the openings in the angle positioning arm. A hinge couples the first elongate member to the second elongate member.

In another embodiment, a non-limiting example of the adjustable fishing rod butt in accordance with one or more aspects of the present invention includes a first elongate member including an opening on a bottom surface thereof extending at least into an interior of the first elongate member, and an alignment locking member secured about the opening on the bottom surface thereof. The alignment locking member includes an opening coaxially aligned with the opening in the first elongate member, and a locking pin opening in sidewalls of the alignment locking member configured to receive a locking pin. A second elongate member includes an adjustable reel seat portion on an upper surface, and an angle positioning arm extending from a bottom surface and oriented to be received by the openings in the first elongate member and the alignment locking member upon articulation of the second elongate member relative to the first elongate member. The angle positioning arm includes a plurality of alignment openings serially arranged along at least a portion of a length of the angle positioning arm, wherein each of the plurality of openings corresponds to a different angular relationship between the first and second elongate members. The locking pin locks the angle positioning arm and the first and second elongate members at a specific angular relationship defined by a selected one of the openings in the angle positioning arm. A hinge couples the first elongate member to the second elongate member. The hinge includes a u-shaped portion at a terminal end of a selected one of the first or the second elongate member and a tongue portion at a terminal end of the other one of the first or the second elongate member. The u-shaped portion and the tongue portion include coaxially aligned openings, wherein the tongue portion is configured to fit within the u-shaped opening portion. A hinge pin is provided in the openings and includes a head and a shaft extending from the head including a threaded terminal portion. At least one of the openings in the u-shaped portion includes a threaded portion configured to receive the threaded terminal portion of the hinge pin.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike:

FIG. 8 illustrates a cross sectional view of an annular hood for use with reel seat assembly in accordance with one or more embodiments of the present invention; and FIG. 9 illustrates an end on view of an annular hood for use with reel seat assembly disposed in an elongate member in accordance with one or more embodiments of the present invention.

Figure 1:
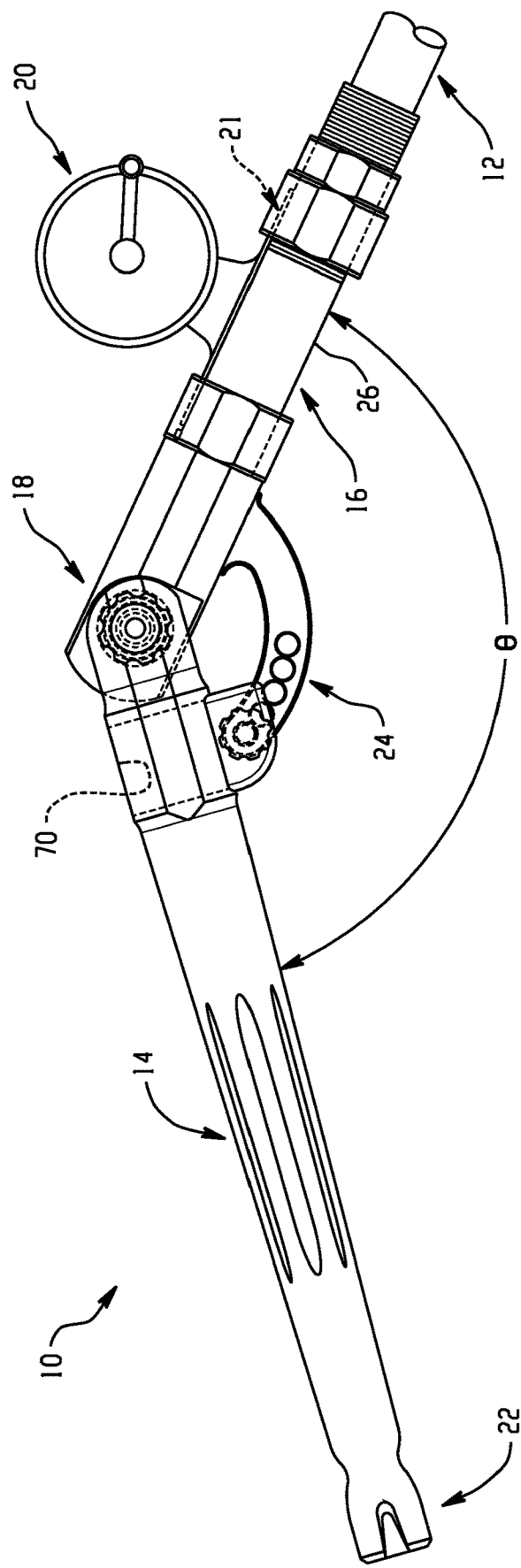
FIGS. 1A and 1B illustrate side perspective views of an adjustable butt and reel seat for a fishing rod in accordance with one or more embodiments of the present invention.

It will be appreciated that for simplicity and clarity of illustration, elements shown in the drawings have not necessarily been drawn to scale. For example, the dimensions of some of the elements could be exaggerated relative to other elements for purpose of clarity.

DETAILED DESCRIPTION

Disclosed herein is an adjustable butt and reel seat assembly for a fishing rod. Depending on the intended fishing application, the adjustable butt can be adjustably configured to provide a curvilinear shape or a linear shape. The angle is adjustable by the adjustable butt and can be utilized to provide a mechanical advantage to the end user during fishing. For example, when fighting relatively large and powerful fish, it is sometime advantageous to employ an angled rod, which can vary depending on the conditions and the particular fish. The rod including the adjustable butt can be positioned to provide a particular angle prior at hooking the fish and then adjusted to a different angle to fight/land the fish. For example, dredge rods typically tow a big teaser (dredge) that goes deeper than regular teasers on the top of the water. When trolling, these types of rods generally have a very heavy weight on them to keep the hook down under the surface. The dredge rods can have a heavy electric reel and are often pointed at the outriggers. Sometimes, depending on where the rod holder is mounted, there is strain on the tip of the rod so the adjustable butt of the present invention allows the end user to adjust the tip so most the strain is gone off the rod.

The adjustable butt and real seat assembly is formed of a high strength material, such as steel, although most preferably, a high strength but substantially lightweight material such as aluminum can be used. Other alloys can be employed.

Detailed embodiments of the adjustable butt and reel seat assembly according to aspects of the present invention will now be described herein. However, it is to be understood that the embodiments of the invention described herein are merely illustrative of the structures that can be embodied in various forms. In addition, each of the examples given in connection with the various embodiments of the invention is intended to be illustrative, and not restrictive. Further, the figures are not necessarily to scale, some features can be exaggerated to show details of particular components. Therefore, specific structural and functional details described herein are not to be interpreted as limiting, but merely as a representative basis for teaching one skilled in the art to variously employ the methods and structures of the present description. For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

FIGS. 1A and 1B are perspective side of an adjustable butt and reel seat assembly and is generally indicated by reference numeral 10 in accordance with one embodiment for use with fishing reel 20 and a fishing rod blank 12, which is partially shown. The adjustable butt and reel seat assembly 10 generally includes a first elongate member 14 hingeably coupled to a second elongate member 16 by a hinge, generally shown at 18. The first and second elongate members 14, 16 are generally cylindrical and can be lockingly positioned relative to one another via a position locking mechanism generally shown at 24. Using the bottom surface 26 of the second elongate member 16 as a reference, butt angles (θ) of about 90 to about 180 degrees of the second elongate member 16 relative to the first elongate member 14 can be provided with the position locking mechanism 24 although it should be noted that the particular angle (or angles) is not intended to be limited. FIG. 1A depicts an angled relationship of less than 180° between the first and second elongate members 14, 16, and FIG. 1B depicts a linear relationship between the first and second elongate members 14, 16. As used herein, the bottom surface 26, refers to the surface opposite the surface securing the fishing reel 20, wherein the top surface refers to the surface securing the fishing reel 20. In various embodiments, the adjustable butt 10 can be configured to provide angles less than 90 and/or greater than about 180 degrees depending on the desired application. Moreover, the adjustable butt 10 can be configured to provide the end user with more than one fixed angle to choose from, i.e., a linear shape and more than one angled shape, as will be described in greater detail below. The first elongate member 14 may optionally include a gimbal end 22 to be received within a socket (also referred to as a gimbal nock, not shown) and may be movably mounted on a fighting chair on a boat, the boat itself, or even on a fighting belt secured to a fisherman. Optionally, the gimbal end 22 may be provided in the form a separate detachable component that is secured to the first elongate member 14 by any suitable means, e.g., press fit, screw fit, and the like or may be machined therewith the first elongate member 14.

Figure 2:
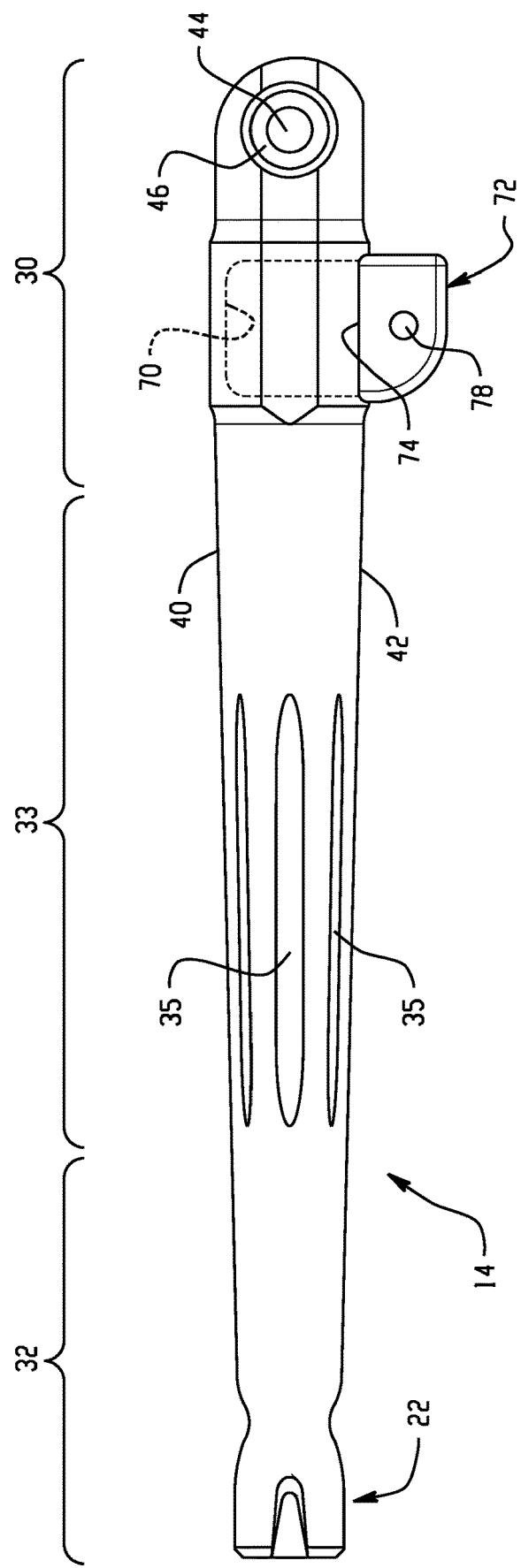
FIG. 2 illustrates a side perspective view of the first elongate member of the adjustable butt and reel seat shown in FIG. 1 in accordance with one or more embodiments of the present invention.
Figure 3:
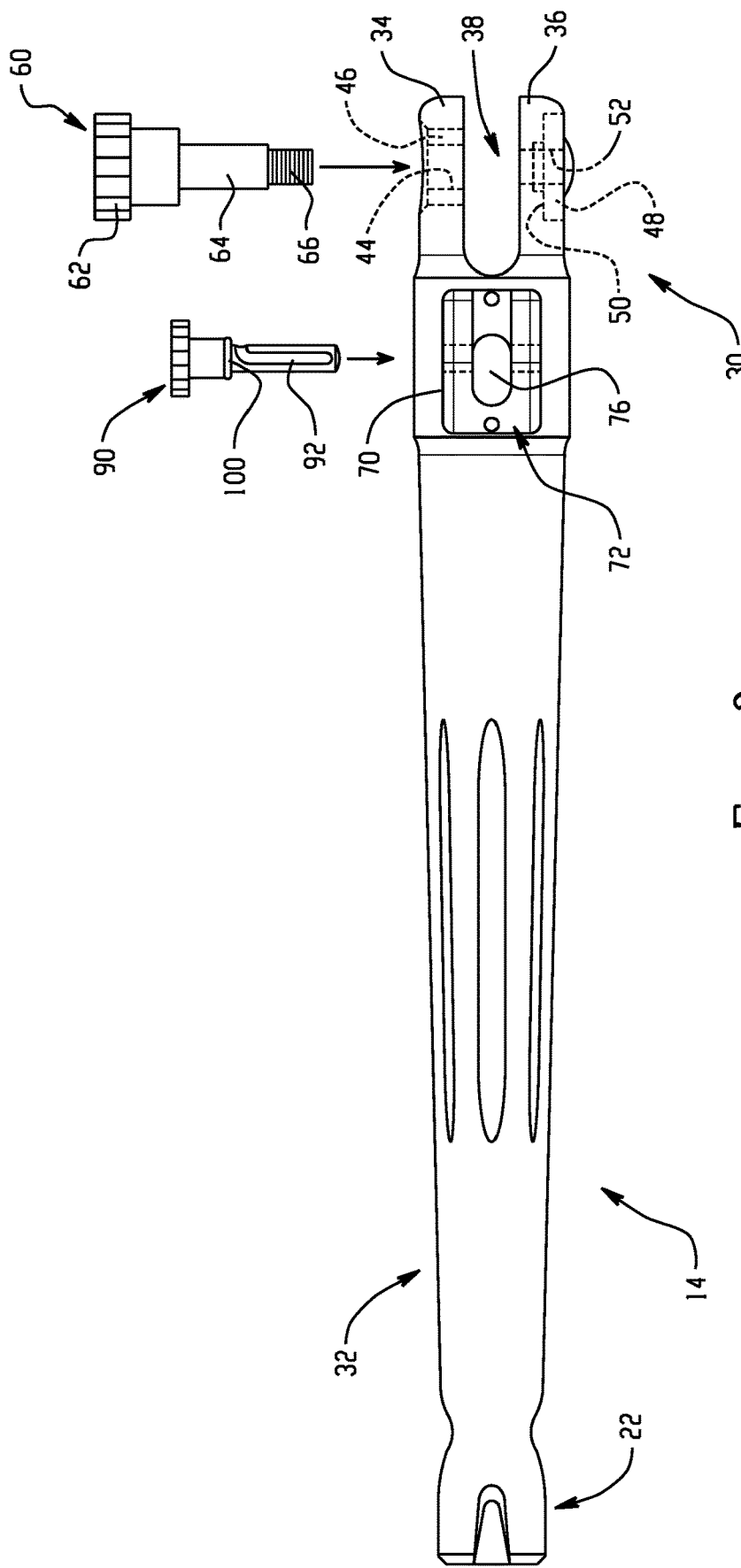
FIG. 3 illustrates a bottom perspective view of the first elongate member of the adjustable butt and reel seat shown in FIG. 1 in accordance with one or more embodiments of the present invention.
Figure 6:
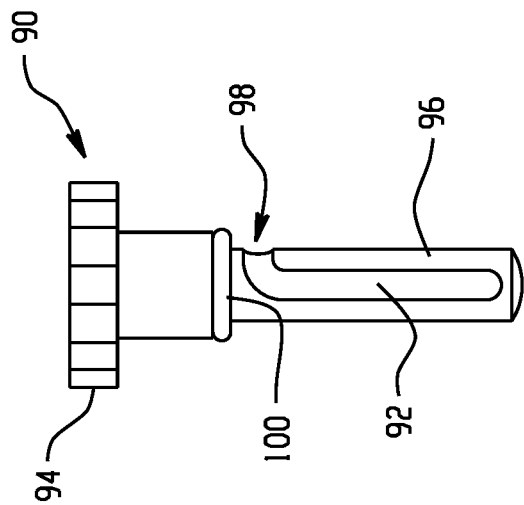
FIG. 6 illustrates a pin for use with the alignment locking mechanism of the adjustable butt and reel seat shown in FIG. 1 in accordance with one or more embodiments of the present invention.

As shown more clearly in the side and bottom views of FIGS. 2-3, respectively, the first elongate member 14 includes a portion 30 proximal to hinge 18 and a distal portion 32. The gimbal end 22 is at terminal end of the distal portion 32. As shown more clearly in FIG. 3, the proximal portion 30 generally includes a U-shaped portion including support members 34, 36 extending from a body portion 33 (FIG. 2) of the first elongate member 14. The body portion 33 can include channels 35 tapered from one end to another end along the longitudinal axis of the first elongate member 14. The channels 35 provide an end user with increased grip of the adjustable butt 10 when in use and are provided about the periphery of the first elongate member 14.

The support members 34, 36 are spaced apart by an opening 38 extending between the top surface 40 to the bottom surface 42 (see FIG. 2). The proximal portion 30 further includes an opening 44 extending through a side of a selected one of the support members, e.g., support member 34. The opening 44 can include a bushing 46 provided in a recess about the opening 44 and is generally dimensioned to accommodate a hinge pin 60 extending therethrough as will be discussed in greater detail below. The opposing support member, e.g., support member 36, includes a threaded opening 52 coaxially aligned with the opening 44 and configured to threadingly receive a threaded portion of the hinge pin 60. By way of example and as shown, the opposing support member 36 can include a member 48 including the threaded opening 52 in a recessed portion 50 of the first elongate member 14. Member 48 can be press fit into the recessed portion 50.

The hinge pin 60 includes a head 62 and an elongated shaft 64 extending from the head 62. The shaft 64 includes a threaded portion 66 at about a terminal end thereof, which is configured to be threadingly received by the threaded portion of threaded opening 52. In this manner, the second elongate member 16 can be hingeably coupled to the first elongate member 14 using the hinge pin 60 during use.

The first elongate member 14 further includes an opening 70 extending interiorly from a bottom surface 42 thereof. In various embodiments, the opening 70 may extend from the bottom surface 42 to the top surface 40 depending on the angular movement range provided by the adjustable butt 10 as is shown in FIG. 1. An alignment locking member 72 is secured about the opening 70 on the bottom surface 42 thereof. The alignment locking member 72 can be seated within a recess 74 in the bottom surface 42 and fixedly and securely attached to the first elongate member 14. The alignment locking member 72 includes an opening 76 coaxially aligned with opening 70 in the first elongate member 14. As shown, the opening 70 is defined by a continuous wall circumscribing the opening. Additionally, the alignment locking member 72 includes opening 78 extending from one side to an opposing side.

Figure 4:
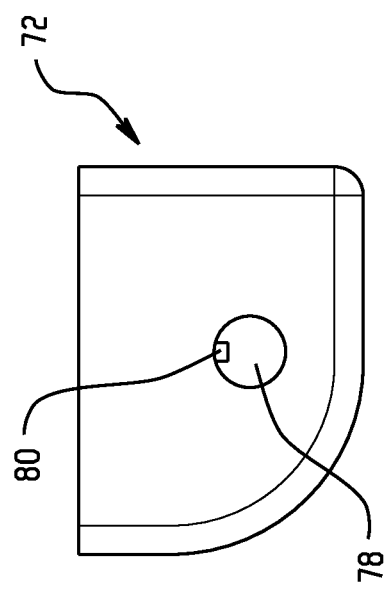
FIG. 4 illustrates a plan view of the alignment locking mechanism of the adjustable butt and reel seat shown in FIG. 1 in accordance with one or more embodiments of the present invention.
Figure 5:
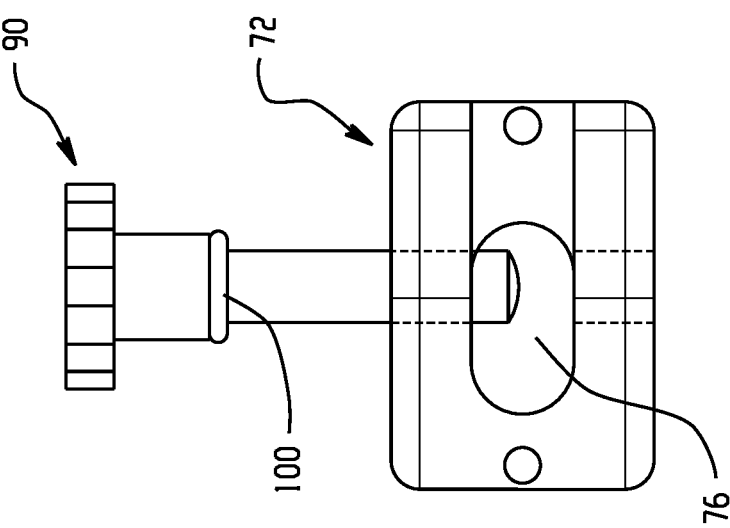
FIG. 5 illustrates a top down view of the alignment locking mechanism of the adjustable butt and reel seat shown in FIG. 1 in accordance with one or more embodiments of the present invention.

Referring now to FIGS. 3-6, the alignment locking member 72 will be described in greater detail. As shown in FIG. 4, a selected one of the openings 78 in the side of the alignment locking member 72 includes a pin 80 partly extending into an interior space of the opening 78. The pin 80 is dimensioned to slideably engage a channel 92 on a locking pin 90 (see FIG. 6), which generally includes a head 94 and a shaft 96 extending from the head 94. The channel 92 longitudinally extends along a length of the shaft 96, wherein one end of the channel 92 terminates proximate to the terminal end of the shaft 96 and another end that terminates proximate the head 94. Proximate to the head 94, the channel 92 is at about less than a right angle relative to the longitudinal axis of the shaft 96 for a relatively short distance of the circumference to define a detent position 98. An elastic o-ring 100 can be provided on the shaft 96 to provide enough resistive force to rotation of the locking pin 90 when in the detent position. In this manner, when engaged with the pin 80 extending into the interior space of opening 78, the head 94 can be rotated to engage the pin 80 with the channel detent position 98 so as to effectively lock the pin 90 at a fixed position. When not in the detent position, the locking pin 90 can be slideably moved long the longitudinal axis of the shaft 96 such that the shaft 96 can be positioned to clear the opening 76 and permit disassembly or assembly of the first and second elongate members 14, 16, respectively. In this manner, an angle positioning arm 110 (see FIG. 7 and the related description) on the second elongate member 16 can be moved to a desired position and subsequently locked at a desired angle by moving the locking pin 90 to the detent position 98. The angle positioning arm 110 is utilized to define the desired fixed angle of the adjustable butt 10 during use, which can be linear or curvilinear.

Figure 7:
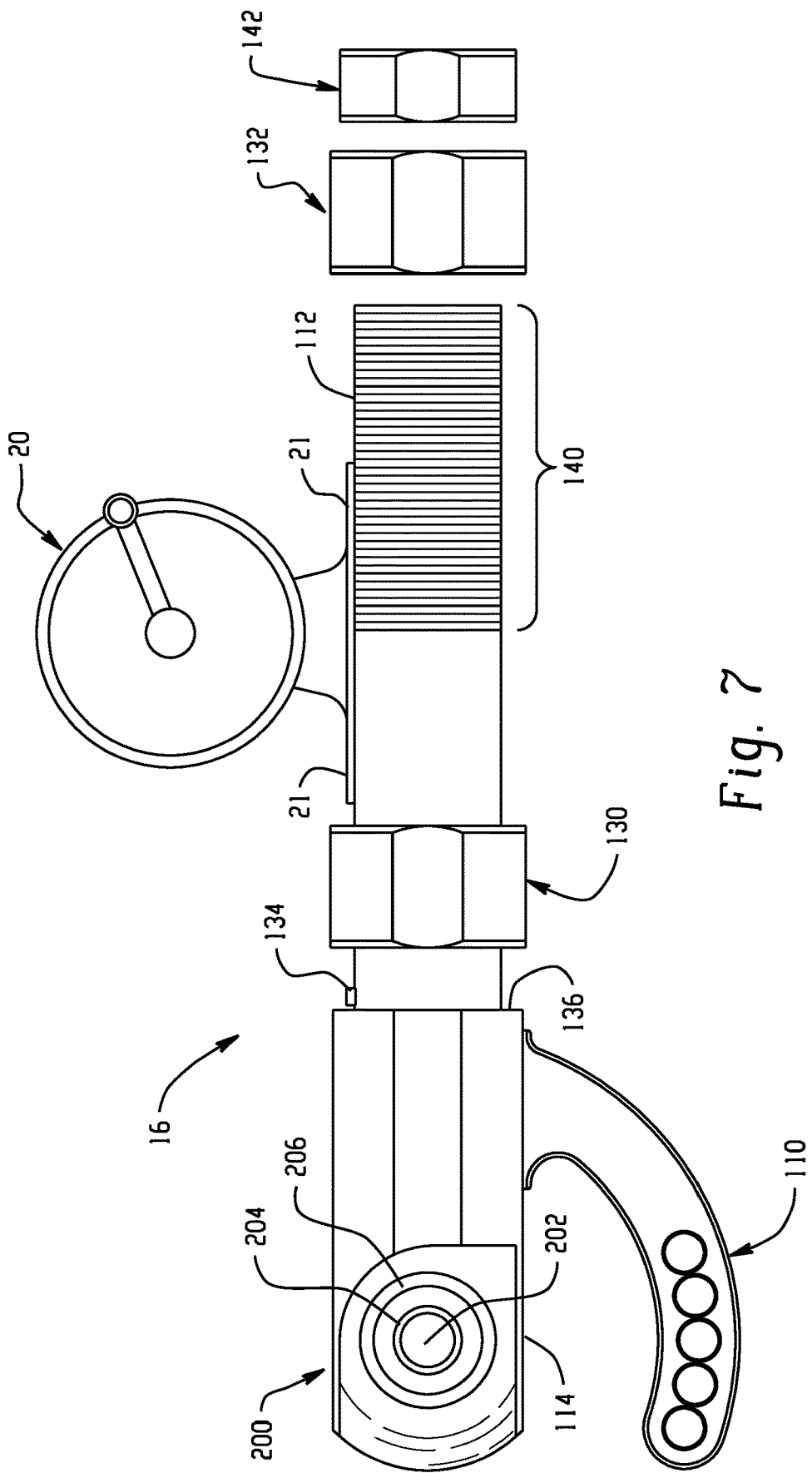
FIG. 7 illustrates a side perspective view of the second elongate member of the adjustable butt and reel seat shown in FIG. 1 in accordance with one or more embodiments of the present invention.

FIG. 7 provides a perspective side view of the second elongate member 16, which includes the reel seat assembly for a reel 20 on a top surface 112 thereof, the angle positioning arm 110 extending from the bottom surface 114 thereof, and a tongue 200 at an end of the second elongate member 16 and proximate to the hinge 18. The tongue 200 is configured to engage the opening 38 of the first elongate member 14. An opening 202 is provided in the tongue 200 and can include a bushing 204 therein. The tongue 200 can further include a circular recess spaced apart from and circumscribing the opening to accommodate an o-ring therein. The opening 202 has a dimension similar to that of the opening 44 in the first elongate member 16 such that when the tongue 200 of the second elongate member 16 is inserted into the opening 38 of the u-shaped portion of the first elongate member 14, the openings 44, 202 can be coaxially aligned and the hinge pin 60 inserted therethrough to hingeably couple the first elongate member 14 to the second elongate member 16.

The reel seat assembly includes a first annular hood 130 and a second annular hood 132. The first annular hood 130 is rotatably disposed about the second elongate member 16 and is proximate to the hinge 18. The second annular hood 132 is moveable along the longitudinal axis of the second elongate member 16 so as to permit some adjustment so as to seat variously sized fishing reels. To secure the fishing reel 20 in the reel seat assembly at a fixed position, second elongate member 16 includes a pin 134 abutting a shoulder 136 of the second elongate member 16 and configured to engage a complementary recessed portion 138 in first annular hood 130 as shown more clearly in FIG. 9.

In this manner, the first annular hood 130 is rotatably locked in a fixed position about the second elongate member 16 when engaged with pin 134, thereby providing secure and proper placement of the reel 20 on the second elongate member 16 as well as preventing rotation of the reel 20 during use. An exterior threaded zone 140 is formed at the other end of the second elongate member 16 and is configured to movably engage the second annular hood 142 with a second reel tongue 21 of the fishing reel 20 so as to securely retain the fishing reel at a fixed position within the reel seat assembly. The interior of the second elongate member 16 at the threaded zone 140 is hollow and is configured to receive the rod blank 12 (shown in FIG. 1). The first and second annular hoods 130 and 132 include recessed portions 42 (shown in silhouette in FIG. 1) configured to receive the first and second reel tongues 21 of the reel 20. The second annular hood 132 is optionally coupled to a nut 142, wherein the nut 142 provides for threaded engagement with threads in the threaded zone 140 so as to retain the fishing reel when tightened. In one embodiment, nut 142 is a collet nut and is rotatably coupled and abuts the second annular hood 132.

FIGS. 8 and 9 provide sectional and end-on views of the first annular hood 130. As shown, one end 152 of the first annular hood 130 includes a recessed portion 138 configured to receive the pin 134 of the second elongate member 16. Another end 154 includes at least one recessed portion 156 for receiving a reel tongue 21. By engaging the pin 134 in the manner shown, the reel 20 is always seated in the same location on the second elongate member 16 (i.e., on a top surface) since the presence of the pin 134, when engaged, prevents rotation of the first annular hood 130. For some embodiments, recessed portion 156 is tapered. The second annular hood 132 includes a similarly shaped recessed portion configured for receiving the second reel tongue 21.

During use, pin 134 is aligned with the recessed portion 138 of the first annular hood 130 to rotatably lock the hood at a fixed position. One of the reel tongues 21 is then inserted into the recessed portion 156 of first annular hood 130 such that the hood 130 is abutting the pin and the shoulder, wherein further lateral movement against the pin is prevented. The second annular hood 132, which is optionally coupled to nut 142, is then movably positioned to engage the other reel tongue 21 with the recessed portion (not shown) of the second annular hood 132, thereby retaining reel 20 within the reel seat assembly. The nut serves to bias the second annular hood 132 so as to retain or release a reel 20 disposed within the reel seat assembly.

Referring to FIG. 7, the angle positioning arm 110 is proximate to the tongue 200 of the second elongate member 16 and is defined by an arcuate shape extending from on a bottom surface of the second elongate member 16. The angle positioning arm 110 is configured to slideably engage the opening 76 in the alignment locking member 72 and the opening 70 in the first elongate member. The angle positioning arm 110 includes a plurality of openings, wherein locking pin 90 is configured to locking engage the angle positioning arm 110 when in use such that insertion of the locking pin and rotation to the detent portion in a selected one of the openings provides a specific angular relation between the first and second elongate members 14, 16, respectfully, as is generally shown in FIG. 1.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adjustable fishing rod butt for use with a fishing reel and a rod blank, comprising:
    a first elongate member comprising an opening in a bottom surface thereof;
    an alignment locking member fixedly attached to the first elongate member comprising a first opening extending from a top surface to a bottom surface coaxial to the opening in the bottom surface of the first elongate member and configured to receive a positioning arm, and side openings configured to receive a locking pin;
    a second elongate member comprising an adjustable reel seat portion on an upper surface thereof, and the positioning arm externally attached to a bottom surface thereof, wherein the positioning arm is configured to be positioned into the opening in the first elongate member;
    a hinge coupling the first elongate member to the second elongate member, wherein the first elongate member further comprises a gimbal end distal to the hinge; and
    a locking pin configured to lockingly engage the positioning arm via engagement with the side openings of alignment locking member that allows the locking pin to lock an angular relationship of the first and second elongate members relative to one another.

2. The adjustable fishing rod butt of claim 1, wherein the angular relationship between the first and second elongate members relative to one another are at an angle equal to or less than 180°.

3. The adjustable fishing rod butt of claim 1, wherein the locking pin comprises a head portion and a shaft portion extending from the head portion, a linear channel extending along a longitudinal length of the shaft terminating at a detent positioning proximate to the head portion, and a resilient o-ring intermediate the head portion and the shaft.

4. The adjustable fishing rod butt of claim 3, further comprising an alignment locking member fixedly attached to the first elongate member comprising a first opening extending from a top surface to a bottom surface coaxial to the opening in the bottom surface of the first elongate member and configured to receive the positioning arm, and side openings configured to receive the locking pin, wherein one of the side openings includes a pin configured to engage the linear channel and guide the locking pin to and from the detent position.

5. The adjustable fishing rod butt of claim 1, wherein the first and second elongate members comprise aluminum.

6. The adjustable fishing rod butt of claim 1, wherein the hinge coupling the first elongate member to the second elongate member comprises a u-shaped portion at a terminal end of a selected one of the first or the second elongate member and a tongue portion at a terminal end of the other one of the first or the second elongate member, the u-shaped portion and the tongue portion comprising coaxially aligned openings, wherein the tongue portion is configured to fit within the u-shaped opening portion; and a hinge pin provided in the coaxially aligned openings including a head and a shaft extending from the head including a threaded terminal portion, wherein at least one of the coaxially aligned openings in the u-shaped portion includes a threaded portion configured to threadingly receive the threaded terminal portion of the hinge pin.

7. The adjustable fishing rod butt of claim 1, wherein the first and second elongate members are substantially cylindrical shaped.

8. The adjustable fishing rod butt of claim 1, wherein the alignment locking member is seated within a recess defined about the opening in the bottom surface of the first elongate member.

9. The adjustable fishing rod butt of claim 1, wherein the positioning arm is arcuate shaped.

10. The adjustable fishing rod butt of claim 1, wherein the adjustable reel seat portion comprises a first annular hood proximate to the hinge, a second annular hood in spaced relationship to the first annular hood, and a nut abutting the second annular hood in threaded engagement with the first elongate member and configured to movably position the second annular hood relative to the first annular hood so as to retain a fishing reel between the first and second annular hoods, wherein the first and second annular hoods comprise at least one recessed portion configured to receive a fishing reel tongue of the fishing reel.

11. The adjustable fishing rod butt of claim 1, wherein the positioning arm comprises at least one opening and the locking pin is configured to selectively engage the at least one opening and lock the angular relationship of the first and second elongate members relative to one another.

* * * * *